United States Patent [19]

Borriello

[11] Patent Number: 4,962,370
[45] Date of Patent: Oct. 9, 1990

[54] OFF-CENTER CAP-LEVEL MAGNETIC FLOAT SEWER ALARM

[76] Inventor: John Borriello, 64 Hillview Ave., Port Washington, N.Y. 11050

[21] Appl. No.: 343,077

[22] Filed: Apr. 25, 1989

[51] Int. Cl.$^5$ .............................................. G08B 21/00
[52] U.S. Cl. .................................. 340/623; 137/558; 200/84 C; 340/624; 73/319; 73/307
[58] Field of Search ............... 340/623, 624, 604, 605; 200/84 A, 84 C; 73/319, 320, 307, 305, 314, 322.5; 116/110, 228

[56] References Cited

U.S. PATENT DOCUMENTS

| | | | |
|---|---|---|---|
| 2,371,511 | 3/1945 | Faus | 116/228 |
| 2,761,037 | 8/1956 | Thomas et al. | 200/83 |
| 2,985,187 | 5/1961 | Hamilton | 137/558 |
| 3,258,968 | 7/1966 | Woodcock | 116/228 |
| 3,603,926 | 9/1971 | Kimura | 200/84 C |
| 3,757,316 | 9/1973 | Fiorenzo | 340/620 |
| 3,774,187 | 11/1973 | Windham | 340/624 |
| 3,896,281 | 7/1975 | Feoktistov et al. | 340/624 |
| 4,091,365 | 5/1978 | Allen | 340/620 |
| 4,297,543 | 10/1981 | Shackcloth | 340/624 |
| 4,392,128 | 7/1983 | Young et al. | 137/558 |
| 4,480,469 | 11/1984 | Tice | 73/313 |

FOREIGN PATENT DOCUMENTS 0028611 2/1897 United Kingdom ................ 340/608

*Primary Examiner*—Joseph A. Orsino
*Assistant Examiner*—Jill Jackson
*Attorney, Agent, or Firm*—Brumbaugh, Graves, Donohue & Raymond

[57] ABSTRACT

A sewer alarm is provided for warning of overflow conditions in a house trap installed in a sewer line, the sensing mechanism consisting of a magnetic float switch with no moving parts other than the float itself and with the magnetic activating switch sealed from the hostile environment found in a house trap. The alarm cap member housing the magnetic float switch has physical dimensions similar to a typical cap installed in an unalarmed house trap and substantially has only wires protruding from its exterior face.

4 Claims, 1 Drawing Sheet

OFF-CENTER CAP-LEVEL MAGNETIC FLOAT SEWER ALARM

BACKGROUND OF THE INVENTION

This invention relates to a sewer alarm for installation in the house trap of a waste line. In particular the invention relates to an alarm for detecting accumulated water in the house trap caused by blockage of the outlet waste line or septic system overflow prior to overflow of the accumulated water into household plumbing fixtures.

While the prior art discloses arrangements for providing an alarm in the event of a blockage, many of the systems described are complex and therefore difficult and expensive to manufacture and install.

It is an object of the present invention to provide a sewer alarm for installation in a house trap that is simple, reliable, inexpensive and easy to install.

SUMMARY OF THE INVENTION

This invention relates to an alarm unit for detecting blockage of a waste line for installation in a service opening of a trap. The unit has a circular cap member that includes a threaded periphery for connection to the service opening, a top portion for closing the service opening and a switch member mounted in an off-center bore in the top portion of the cap member. The switch member has a central rod containing a magnetically activated switch that extends from the inner surface of the top portion. The switch member also has a float member circumferentially surrounding the central rod and slideably moveable on the central rod between a first position near the top portion of the cap member and a second position away from the top portion that is defined by a lower stop on the central rod. The float member has a permanent magnet for activating the magnetically activated switch to close the switch when the float member is in the first position and to open the switch when the float member is in tee second position. The switch member is mounted to the bore by a portion of the central rod that is remote from the lower stop. The switch member has electrical leads that extend from the central rod to the exterior side of the top portion.

DESCRIPTION OF THE PREFERRED EMBODIMENTS

Figure 1:
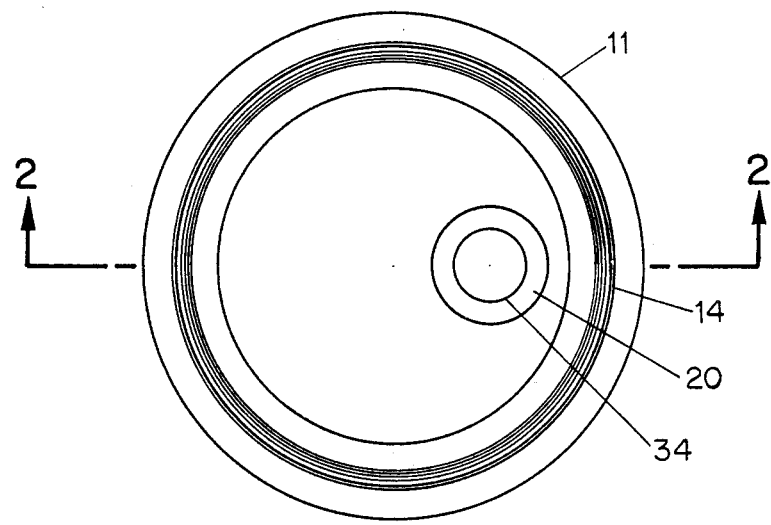
FIG. 1 is a bottom view of a sewer trap alarm in accordance with my invention.
Figure 2:
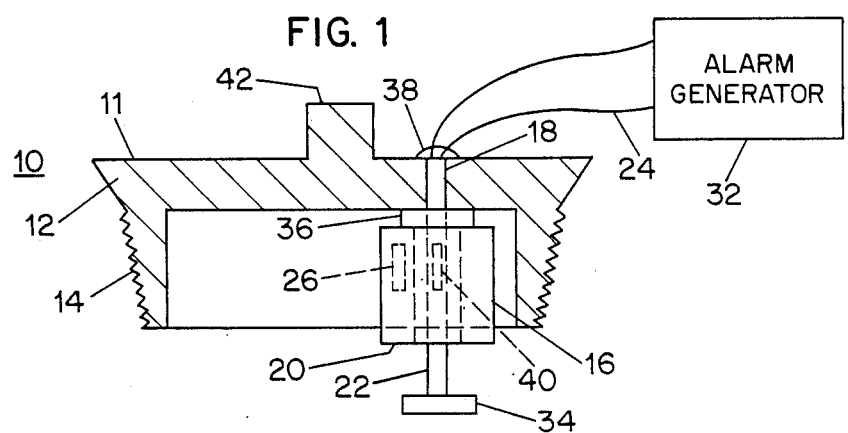
FIG. 2 is a cross-sectional view of the FIG. 1 alarm.

FIGS. 1 and 2 illustrate a preferred embodiment of the present invention. A sewer alarm 10 is formed using a conventional cap member 12 fabricated of cast iron and preferably including a lead threaded collar 14 for connection to the openings of a house trap. The internal structure of the alarm cap member 12 is shown in the cross-sectional view of FIG. 2. The top portion 11 of the cap member 12 is provided with an off center bore 18 which receives the shaft portion of a switch member 16. Bore 18 may be tapped for receiving a threaded shaft portion. Alternately the shaft may be attached by epoxy. Accordingly, the float switch 16 is also off-centered. This arrangement enables the float switch 16 to be installed at a position in the trap opening which is remote from the waste inlet to increase the distance between the installed float switch 16 and the onrushing waste entering the house trap 30. As a result, the onrushing waste is less likely to damage or activate the float switch 16 thereby reducing the frequency of false alarms and increasing the life expectancy of the float switch 16.

The float switch 16 used in the present invention is commercially available. The central rod 22 and the float member 20 are the two major components of the float switch 16. Inside the central rod 22 is a magnetically activated switch 40. Float member 20 carries a permanent magnet 26 for activating switch 40 when float 20 is in its upper position. The central rod 22 is coated with a water-resistant plastic so that the fluid and material in the house trap 30 cannot damage the central rod 22 or the magnetically activated switch 40. The upper portion of the central rod 22 is threaded so that it can be screwed into the off-centered hole 18 of the top portion 11 of the alarm cap member 12. Two wires 24 protrude from the upper end of the central rod 22. These wires 24 electrically connect the magnetically activated switch 40 in the central rod 22 to an alarm generator 32 which is capable of producing an alarm sound. A sealing compound 38 is applied over the upper end of the central rod 22 and over the portion of the exterior face of the top portion 11 of the alarm cap member 12 adjacent to the off-centered hole 18. This prevents any leakage of water out of the alarm cap member 12 or into the central rod 22. Since the wires 24 and the sealing compound 38 are the only components that protrude from the exterior face of the alarm cap member 12, the alarm cap member 12 will fit in any location whose external clearance supported the installation of the original cap.

The lower portion of the central rod 22 extends approximately perpendicularly from the interior face of the top portion 11 of the alarm cap member 12. The lower portion of the central rod 22 only extends approximately one inch below the sides of the alarm cap member 12. This short extension below the sides of the alarm cap member 12 enhances its compatibility with the existing house trap and lowers the possibility of false alarms.

At either end of the extended portion of the central rod 22 is a mechanical stop 34, 36, each consisting of a thin piece of plastic material with a diameter larger than the diameter of the central rod 22. The float member 20 is positioned between the two mechanical stops 34, 36 and around the central rod 22. The float member 20 has a cylindrical shape and is fabricated from a lightweight, water-resistant plastic. The float member 20 has a concentric hole whose diameter is larger than the diameter of the central rod 22 but is smaller than the diameter of the mechanical stops 34, 36. As a result, the float member 20 can move freely along the axis of the central rod 22 between the two mechanical stops 34, 36. Imbedded in the float member 20 is a magnet 26. When the float member 20, typically resting on the lower mechanical stop 34, travels upward, the magnet 26 in the float member 20 causes the magnetically activated switch 40 to close. This, in turn, permits operation of the alarm generator 32. Alarm generator 32 may be operated by house current, for example, by a doorbell circuit, or, more conveniently in some installations, by battery power.

With the alarm cap member 12 and the float switch 16 installed in a house trap 30, if the outlet waste line 29 becomes blocked, the water level in the house trap 30 will rise. Once the water forces the float member 20 in the upward direction as shown in FIG. 2, the magnet 26 will close the magnetically activated switch 40 resulting in an alarm signal from the alarm generator 32.

The selection of the proper float switch 16 is important to the present invention. The design chosen is durable and not susceptible to corrosion. Furthermore, its only moving part is the float member 20 thereby eliminating mechanical wear. Since the switching mechanism inside the central rod 22 is sealed from the hostile environment inside the house trap 30, malfunction due to water leakage is eliminated. The result is a reliable and rugged sewer alarm. Additionally, the small physical size of the float switch 16 enables the alarm cap member 12 to be compatible with preexisting house traps 30 resulting in unalarmed house traps being easily adapted to the present invention.

Figure 3:
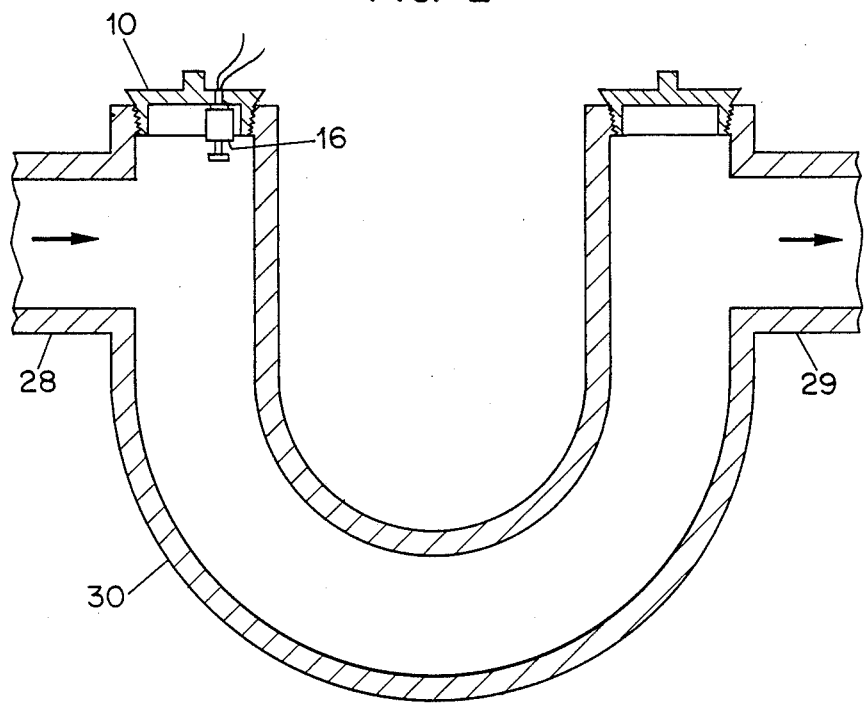
FIG. 3 shows a cross-sectional view of a waste line illustrating the installation of the invention.

FIG. 3 shows the proper installation of alarm cap 10 in a house trap 30. The conventional cap is removed from the inlet side of the house trap and replaced with the alarm cap 12. The alarm cap is threaded until approximately hand tight and then further threaded until switch member 16 is facing away from the inlet waste line 28. At this point the lead seal is tightened by pounding the turn knob 42 of cap alarm 12 with a hammer.

While there has been described what is believed to be a preferred embodiment of the invention, those skilled in the art will recognize that modification may be made thereto without departing from the spirit of the invention and it is intended to claim all such modifications as fall within the scope of the invention.

I claim:

1. An alarm unit for detecting blockage of a waste line for installation in a service opening of a trap, immediately adjacent a horizontal waste line connected to said trap, comprising a circular conventional cap member including a threaded periphery for connection to said service opening and having a horizontal top portion closing said service opening and a switch member mounted in an off-center bore in said top portion of said cap member, said switch member including a central rod containing a magnetically activated switch extending from the inner surface of said top portion and a float member circumferentially surrounding said central rod and slideably moveable on said central rod between a first position near said top portion and a second position away from said top portion and defined by a lower stop on said central rod, said float member including a permanent magnet for activating said magnetically activated switch to close said switch when said float member is in said first position and to open said switch when said float member is in said second position, said switch member being mounted to said bore by a portion of said central rod remote from said lower stop and including electrical leads extending from said central rod to the exterior side of said top portion, said threaded periphery being fabricated such that said cap member can be tightened in said service opening while said switch member in the off-center bore is oriented horizontally away from the inlet of the trap connected to the horizontal waste line, whereby when said alarm unit is mounted directly to the service opening of the trap adjacent the waste line with said switch member oriented away from said waste line, said switch member is activated in response to a blockage condition, but is not activated by normal flow in said waste line.

2. A sewer alarm according to claim 1 wherein sealing means are provided to seal said central rod and said leads.

3. A sewer alarm according to claim 1 wherein said central rod extends less than one inch below said alarm cap member.

4. A sewer alarm according to claim 1 wherein said threaded periphery is fabricated of lead.

* * * * *